April 11, 1961   H. P. HENRY   2,979,166
BRAKE MECHANISM FOR TRAILER VEHICLES
Filed Sept. 8, 1958   2 Sheets-Sheet 1
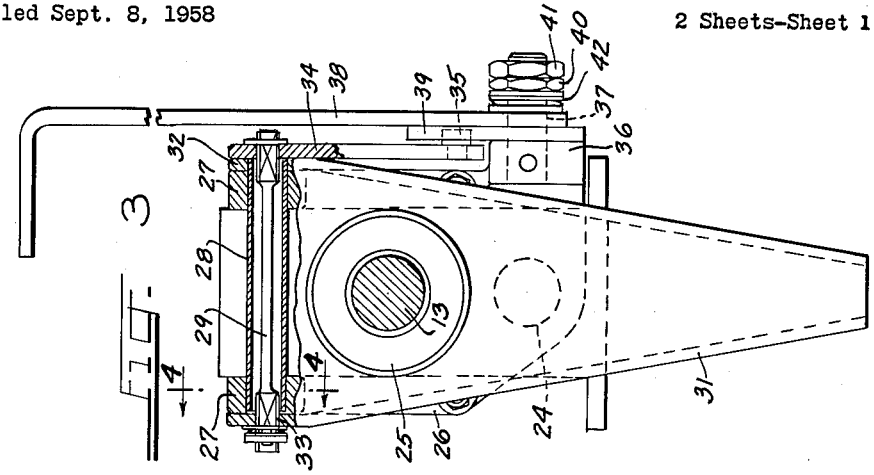
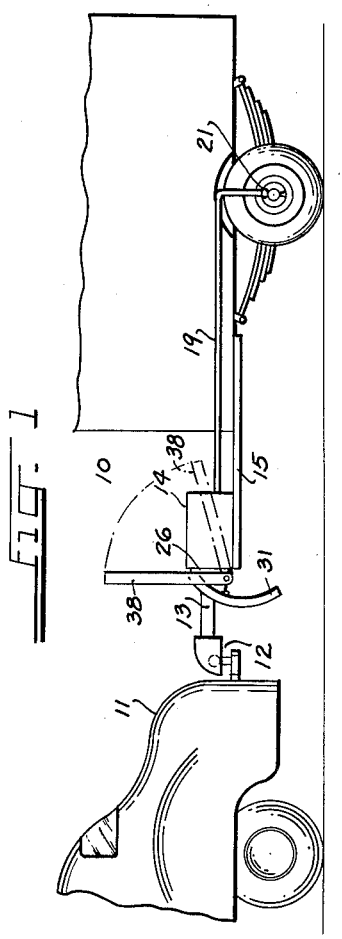
INVENTOR.
HOWARTH P. HENRY
BY
Kegan, Bellamy & Kegan
ATT'Y S.

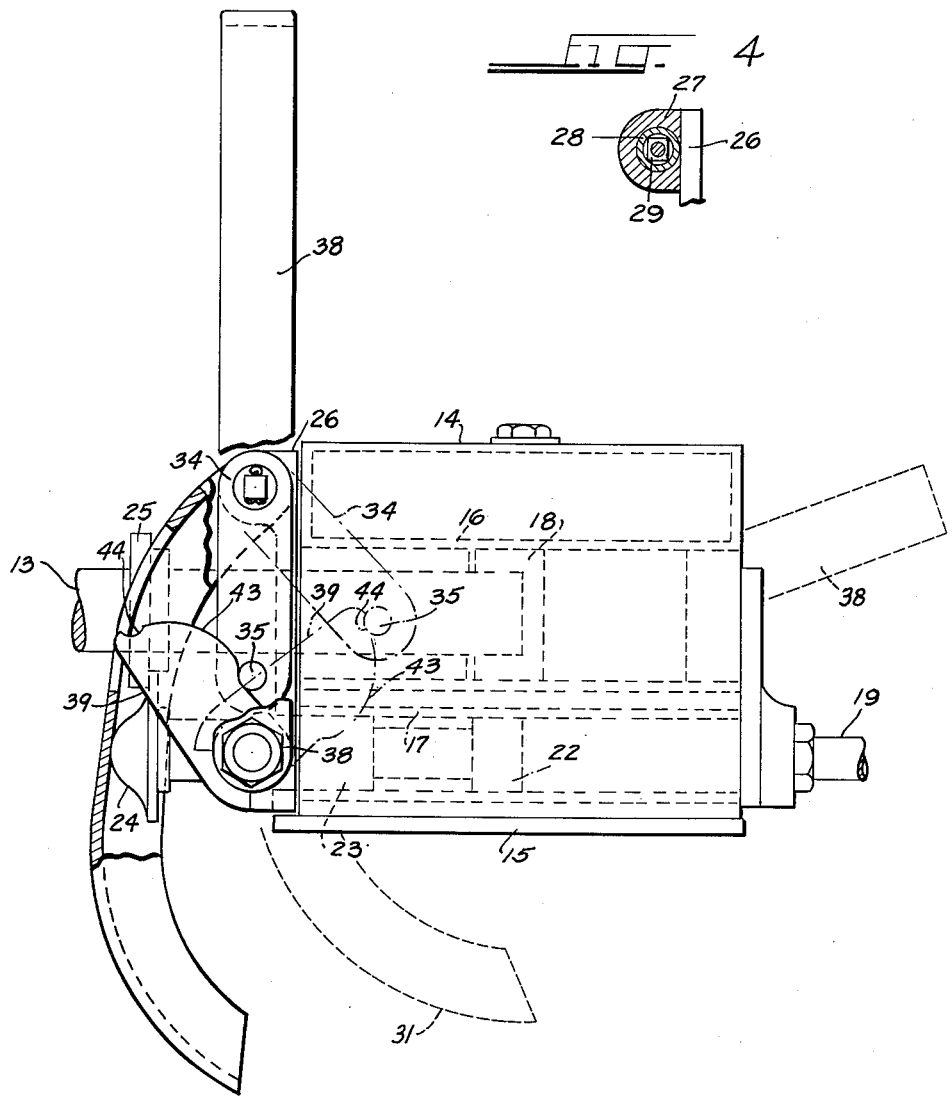

2,979,166

BRAKE MECHANISM FOR TRAILER VEHICLES

Howarth Padgett Henry, 140 W. 42nd St.,
New York, N.Y.

Filed Sept. 8, 1958, Ser. No. 759,588

Claims priority, application Great Britain Sept. 12, 1957

2 Claims. (Cl. 188—112)

This invention relates to brake mechanism for trailer vehicles, of the kind in which the brakes of the trailer vehicle are normally applied automatically as a result of the trailer vehicle tending to overrun a towing vehicle when the speed of the latter is reduced, the relative movement of the vehicles displacing a piston in a liquid pressure master cylinder to create liquid pressure which acts in wheel cylinders to apply the trailer brakes.

The object of the present invention is to provide an arrangement whereby the master cylinder is also operable to apply the brakes manually for parking purposes, or automatically in the event of the trailer breaking away from the towing vehicle.

According to the present invention, in a trailer vehicle brake mechanism of the kind referred to, the master cylinder piston as well as being operable to apply the trailer brakes by relative movement of the trailer vehicle and a towing vehicle, is operable manually through resilient means, and is also operable automatically by a member which comes into engagement with the ground if the trailer vehicle breaks away from the towing vehicle.

The ground engaging member may comprise a sprag arm which acts directly on the master cylinder piston and is capable of being urged in the direction for operating the piston by the resilient means, which are stressed by movement of a hand lever.

Alternatively the resilient means may act directly on the master cylinder piston.

The invention is hereinafter described with reference to the accompanying drawings, in which:

Figure 1 is a partial side elevation of a towing-and-trailer vehicle combination having trailer vehicle brake mechanism according to the invention;

Figure 2 is a side elevation, partly in section and on a larger scale, of the brake operating unit shown in Figure 1;

Figure 3 is a front view of the parts shown in Figure 2; and

Figure 4 is a detail sectional view on the line 4—4 of Figure 3.

Referring to Figure 1 of the drawings, a trailer vehicle 10 is coupled to a towing vehicle 11 by means of a ball hitch 12 the socket of which is mounted on a rod 13 slidable in and projecting from a box-like housing 14 mounted on the tow-bar 15 of the trailer vehicle.

The housing 14, as shown in Figure 2, has mounted in it two parallel cylinders 16 and 17, the upper one, 16, of which is co-axial with the rod 13 and constitutes, with a head 18 on the said rod, a liquid pressure damper to control relative movement of the two vehicles.

The lower cylinder 17 constitutes a master cylinder for operating the trailer brakes, its rear end being connected by a conduit 19 to the wheel cylinders of the brakes, one of which is shown at 21 in Figure 1. The piston 22 of the master cylinder is carried by a rod 23 projecting forwardly from the housing 14 and having, on its forward end, a head 24 adapted to be engaged and pushed rearwardly by a collar 25 on the rod 13 when the towing and trailer vehicles approach one another.

Mounted on the front end of the housing 14 is a bracket 26 having, at its upper end, two laterally spaced ears 27, 27 supporting a horizontal tube 28 in which is mounted a torsion bar 29 the enlarged ends of which are of substantially square cross-section and of such dimensions that the bar 29 is located centrally in the tube 28, as shown in Figure 4.

A sprag arm 31, channel-shaped in cross-section, pivots at its upper end about the axis of the tube 28, the said tube, at one end, extending into a hole in one side wall 32 of the sprag arm to provide a bearing therefor, and the other side wall of the said sprag arm being formed with a square hole at 33 to receive one end of the torsion bar 29. The other end of the torsion bar 29 fits in a square hole in one end of an arm 34 having a stud 35 mounted in its other end. Thus, movement of the arm 34, for example counterclockwise as seen in Fig. 2 of the drawings, twists the torsion rod 29 to which it is affixed, which in turn swings the sprag arm 31, likewise for example, in a counterclockwise direction by reason of the opposite squared end of the torsion rod being connected thereto as aforesaid.

A single lug 36 at the lower end of the bracket 26 has mounted in a hole therein a stud-shaft 37 on which is mounted a two-armed lever 38, 39, held in position by locked nuts 40, 41 and a spring washer 42 on the shaft. One arm 38 of the lever forms a hand lever for manual operation of the brakes, and the other arm 39 is formed with a cam edge 43 adapted to cooperate with the stud 35 on the arm 34.

The parts 38, 39 are shown in full lines in Figure 2 in the position in which the brakes are inoperative. If the rod 13 is moved into the housing 14 by relative approach of the vehicles the brakes are applied by movement of the master cylinder piston 22, which is displaced by the collar 25. To apply the brakes manually, such as for parking, the lever arm 38 is moved in a clockwise direction to reach a position at or beyond that shown in chain-dotted lines in Fig. 1. Such movement brings fixedly attached cam lever arm 39 and lever 34 to the chain-dotted position thereof shown in Figure 2, the angular driven movement of the arm 39 causing the stud 35 to ride up the cam edge 43, thereby rotating the arm 34 to apply a torsional load to the bar 29. This torsional load is applied by the bar 29 to the sprag arm 31 which bears on the head 24 and exerts a thrust on the master cylinder piston 22 to apply the brakes.

When the driven lever arm has driven lever 34, through stud 35 riding on cam surface 43, to the position shown in chain-dotted lines for 34, 35, 39, the stud 35 drops into a notch 44 in the cam edge, and the parts are locked in that position, the torsional loading of the bar 29 holding the brakes in the applied position. The inclusion of the torsion bar 29 between the locked arm 39 and the sprag 31 allows the latter to move slightly to follow up movements of the master cylinder piston 22 due to changes in volume of the liquid in the braking system. The cam-and-follower mechanism provides a mechanical advantage between the lever 38, 39 and the sprag arm 31, and the slope of the cam edge is preferably such that the stud 35 tends to run down the cam edge to the brake-disengaged position, the notch 44 preventing such movement when the lever 38, 39 has made its full movement. Thus the brakes cannot be left in a partially applied condition.

If the trailer vehicle 10 breaks away from the towing vehicle 11, and assuming that the said trailer vehicle is nose-heavy, the lower end of the sprag arm 31 strikes the ground and is dragged backwardly, thus moving the master-cylinder piston 22 to apply the brake by direct rearward thrust on head 24 of piston rod 23.

The resilient means, instead of being in the form of a torsion bar as above described, may comprise rubber in torsion, shear or compression. Alternatively a leaf spring may be fixed to the arm 34 so as to engage and press on the sprag arm 31.

While I have described above the principles of my invention in connection with specific apparatus, it is to be clearly understood that this description is made only by way of example and not as a limitation to the scope of my invention.

I claim:

1. A braking mechanism for use with a tractor-drawn trailer, comprising a master cylinder having a piston registering therewith, a rod connecting said trailer and tractor for limited relative movement therebetween, means effecting engagement between said rod and said piston to urge said piston into said cylinder upon approach between said tractor and trailer, a movable sprag arm coupled to said piston and depending below the level thereof, a pivoted hand lever coupled to said piston and movable therewith between a fully advanced and retracted position, a first angularly disposed leg carried by said hand lever and having a cam-defining edge provided with a latching recess, and a second angularly disposed leg coupled to said sprag arm and carrying a follower defining pin bearing upon said cam edge and registering with said latching recess when said hand lever is in its fully advanced position.

2. A braking mechanism in accordance with claim 1, including a torsion bar connecting said sprag arm and said second leg.

References Cited in the file of this patent

UNITED STATES PATENTS

| 2,779,443 | Tucker | Jan. 29, 1957 |
| 2,834,437 | Davids | May 13, 1958 |

FOREIGN PATENTS

| 805,604 | Germany | Mar. 15, 1951 |
| 924,369 | Germany | Jan. 30, 1955 |